April 17, 1928.　　　　　J. WILLMANN　　　　　1,666,804
PROCESS FOR FREEZING ICE CREAM
Filed Nov. 22, 1922　　　2 Sheets-Sheet 1
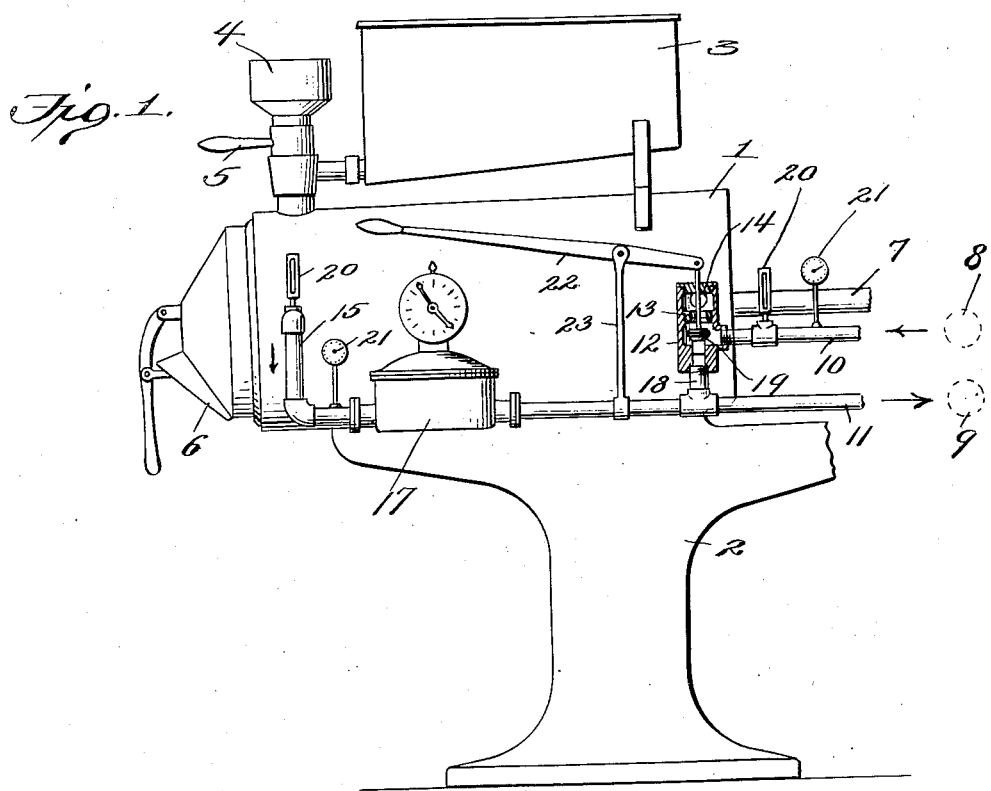
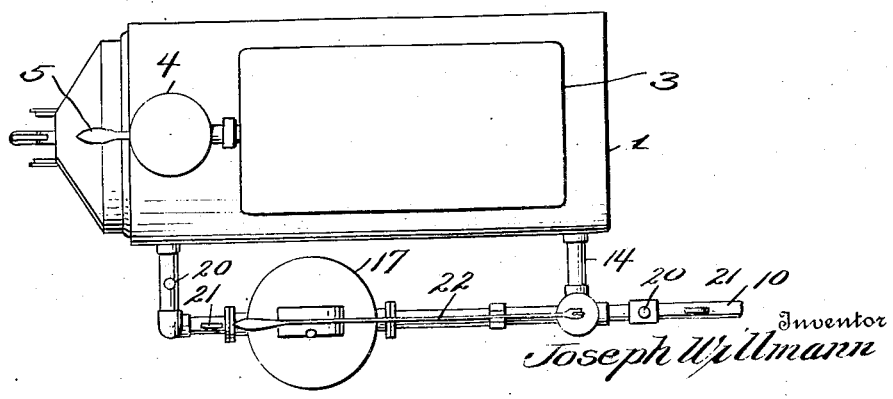

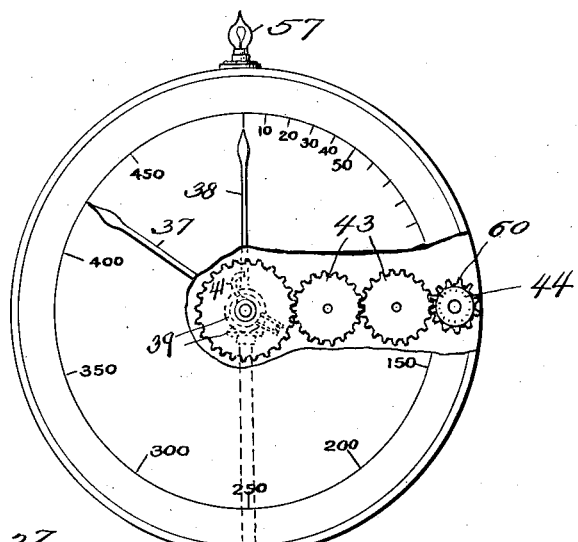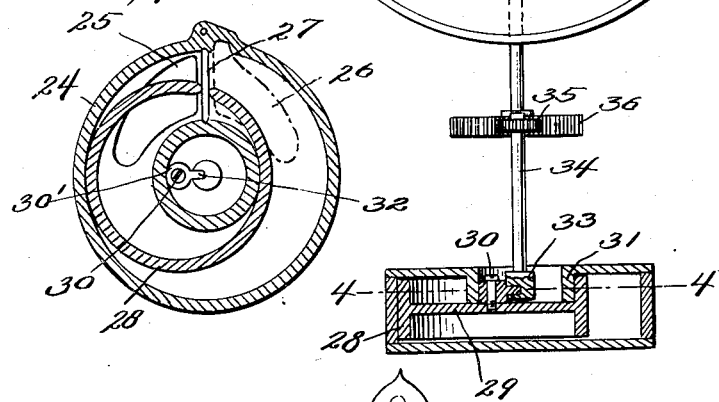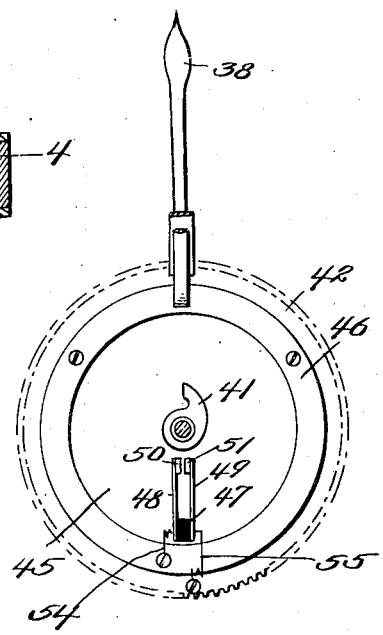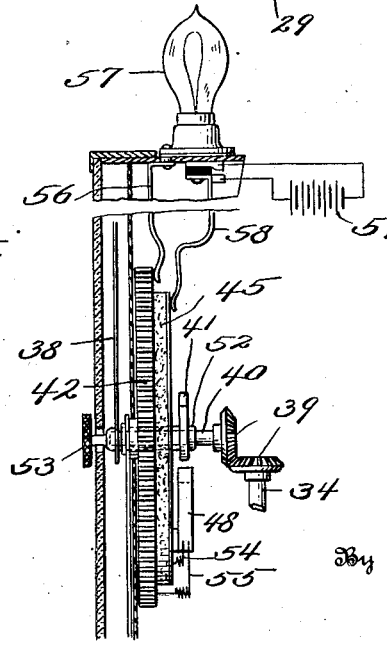

Patented Apr. 17, 1928.

1,666,804

UNITED STATES PATENT OFFICE.

JOSEPH WILLMANN, OF DERBY, CONNECTICUT.

PROCESS FOR FREEZING ICE CREAM.

Application filed November 22, 1922. Serial No. 602,623.

This invention has for its chief object the exposition of a method of operating an ice cream machine by means of a brine meter and is particularly, although by no means exclusively adapted to carrying out the "Willmann process" of ice cream manufacture, in which the ice cream mixture is subjected to refrigerating action of brine or other fluid refrigerant, until it acquires a critical predetermined temperature, at which the brine flow is cut off and the mixture then subjected to a whipping process at substantially constant temperature for a critical period of time in order to produce the maximum overrun or proportion of incorporated air which is essential to modern methods of ice cream making. In my pending application No. 583,267, filed Aug. 21, 1922, is described a device for announcing to the ice cream maker the moment at which the mix arrives at the critical whipping temperature so that the brine flow may be cut off but the present invention contemplates a method which eliminates the need for any thermal indicating or signalling device, and by which the ice cream maker determines the critical whipping point solely by reading the brine meter and cutting off the brine flow to the ice cream freezer when the appropriate quantity of brine has passed therethrough.

The freezing of ice cream being primarily a phenomenon of heat interchange, the successful operation of the method disclosed in the present application depends upon prior knowledge of the consistency and temperature of the mix and the temperature of the brine. The whipping periods for mixes of various proportions and at different mix and brine temperatures having been ascertained by experiment and tabulated, the method is readily carried out by passing a circulation of brine in heat exchanging relationship with the mix in the ice cream freezer until the predetermined quantity of brine, as indicated by the brine meter, has been so passed, at which time the brine flow is cut off and the whipping continued in the usual manner.

The invention also concerns itself with the provision of novel means by which the foregoing method may be most efficiently and conveniently carried out.

Additional objects of the invention will appear in the following specification in which the preferred form of my invention is disclosed.

In the drawings similar reference characters refer to similar parts in all the views in which:—

Figure 1 is a front elevation of an ice cream freezer showing my improved brine meter installed in the refrigerant circulation system thereof.

Figure 2 is a plan view of the same.

Figure 3 is a front elevation of the indicating and signalling portion of the meter, some of the measuring elements being shown in section.

Figure 4 is a cross section taken along the line 4—4 of Figure 3.

Figure 5 is a detail view taken in vertical cross section showing the electrical connections of the signalling mechanism.

Figure 6 is a rear elevation of the rotatable setting switch.

Referring now in detail to the several figures, the numeral 1 represents a jacketed ice cream freezer which is supported upon the base 2 and is provided with the mix hopper 3, the fruit or flavor hopper 4 and means 5 for manually admitting the contents of said hoppers to the freezer. A discharge gate 6 is provided at the forward end of the freezer and from the rear end thereof extends a shaft 7 which is connected on the inside of the freezer with dasher and scraper mechanism not shown, and at its outer end with a source of power. The ice cream freezer here shown is one of a battery of several each of which is connected in parallel with a brine inlet main 8 and outlet main 9 by means of the inlet and outlet conduits 10 and 11 respectively. A valve casing 12 is provided by means of which the inlet pipe 10 communicates with the jacket of the ice cream freezer through the valve controlled aperture 13 and the port 14. The jacket discharges through an outlet pipe 15 which communicates with the chamber of the outmeter 17, the latter discharging into the outlet conduit 11. The valve casing communicates also with the outlet conduit by means of the branch pipe 18. A valve 19 reciprocates within the casing 12 and is double seated so as to assume sealing relationship between the inlet conduit 10 and the inlet port 14 or between said inlet conduit and the outlet conduit 11. Thus when the valve is seated in its lower position, refrigerant flows through the freezer jacket by way of the port 14, discharging into the meter and back to the outlet main 9. When the valve is seated in its uppermost position the circulating brine is excluded from the freezer jacket and from the meter, being by-passed downwardly through the branch pipe 18 into the discharge conduit. The meter is thus in a position to indicate and register only the quantity of brine passing through the freezer jacket. For convenience in determining various conditions of temperature and pressure which are necessary to the advantageous operation of the ice cream machine thermometers 20 and pressure gauges 21 are placed in the inlet conduit and outlet pipe leading respectively to and from said jacket. Means, which as here shown as a lever 22 which is supported from the standard 23 is connected with the stem of the valve 19 and by which said valve is shifted from one position to the other.

In operating the ice cream freezing machine the valve 19 is maintained in its lowermost position a sufficient length of time to permit a predetermined quantity of brine to pass through the jacket of the ice cream freezer. The appropriate quantity thus to be passed is calculated beforehand, taking into account several factors, among which are the temperature of the brine, the temperature of the mix, the sugar content and quantity of the latter and other factors which it does not seem necessary here to mention. It may be inferred, however, from the above that the quantity of brine required will vary with the freezing of different batches. When the proper amount of brine has been run through the freezer, the lever 22 is manipulated to throw the valve to its upper seat permitting the brine to by-pass through the branch conduit 18, being excluded from the jacket and maintaining the temperature of the mix within the freezer at a substantially constant temperature during the whipping period of the ice cream making process.

It is to be understood that while I have described a specific physical means for carrying out my novel method, it is not essential that the freezer be one of a plurality of units connected into a common brine circulation system, nor does the practice of the method depend upon any specific construction of shut off valve. It is essential only that the freezer be provided with a brine circulation system and that a meter be intercalated into the same for ascertaining when a predetermined quantity of brine has passed into heat interchanging relationship with the wall of the freezer.

The meter may be of any improved type of flow indicating and registering meter, but for the purpose of attaining the highest degree of efficiency in the practice of the present method of freezing ice cream, I have devised the signal actuating brine meter 17 which comprises a casing 24 forming a cylindrical measuring chamber having an inlet port 25 at the bottom thereof and an outlet port 26 at the top. A partition 27 extends radially inward from the circumferential wall of the chamber 24. Within this chamber oscillates a piston 28 which has the form of a split ring, the split side thereof embracing the partition 27 and by which the piston is guided in its movements. The piston 28 is formed with a web 29 intermediate its ends having a pin 30 journally supporting a roller 30' which engages the inside surface of a downwardly extending annular flange 31 formed upon the top wall of the casing. The piston in its various positions of oscillation intersects the areas of the inlet and outlet ports as shown in Figure 4 causing a varying differential pressure on the inside and outside thereof which oscillates the piston 28 from one side of the casing to the other, the split side of said piston meanwhile moving reciprocably along the partition 27. The oscillatory movement of the piston causes revolution of the roller 30' around the inner surface of the ring 31. An operating arm 32 extends from one side of the roller and engages a coupling member 33 at the lower end of a gear supporting stem 34. The gearing 35 and 36 which is driven by rotation of this stem forms an element of the registering and indicating mechanism, not shown, by means of which the indicating hands 37 and 38 are actuated. The meter construction thus far described is well known and is here disclosed merely as affording a basis for certain features of my invention it being understood that any form of measuring device whatever may be equally adaptable to combination with the novel features of said invention.

The upper end of the stem 34 is connected by suitable gearing 39 with the transverse shaft 40 upon which is mounted a sleeve 52 to the forward end of which the hand 38 is fixed. This sleeve bears against the shaft 40 with frictional engagement so as to normally rotate therewith and is provided with a thumb nut 53 by means of which the hand 38 may be turned back to a zero position, the sleeve 52 then moving relatively to the shaft 40. This sleeve carries also a contact closing lever 41, shown in Figure 6. The movement of the hand 38 and the mechanism by which it is driven is responsive to quantities of brine passing through the meter.

Mounted concentrically upon the sleeve 52, but rotatable independently thereof is the gear 42 which is connected by means of a train of gears 43 with a manually rotatable knob 44. On the face of the gear 42 is secured an insulating element 45 which is here shown in the form of a fiber disk upon the front face of which is carried a conductive ring 46. A normally open switch is also secured to the insulation disk 45. This switch comprises a non-conductive block 47 to which are fastened the resilient blades 48 and 49 terminating in contact pins 50 and 51, best shown in Figure 6. One of the contact points is in conductive relation with the ring 46 while the other is connected to the metallic gear 42. When the contacts 50 and 51 are closed a circuit is completed through said gear and said ring. The contacts 50 and 51 are in the path of movement of the lever 41 and by rotating the knob 44 the disk 42 may be rotated so as to change the angular position of said contacts relative to the lever 41. Thus when the hand 38 is in zero position as shown in Figures 3 and 6 with the lever 41 in the position shown, the switch may be set so as to cause the hand 38 to travel through any angle desired before the lever 41 engages the contacts of the switch, bringing them together.

Means are provided for connecting the contacts 50 and 51 respectively in conductive relation with the ring 46 and with the gear 42, said means being represented in the present instance by the wires 54 and 55. A brush 56 makes wiping engagement with the surface of the gear 42 and connects with one pole of the electric lamp 57. A similar brush 58 bears against the surface of the ring 46 and is in series with a source of electrical energy 59 which is connected to the other pole of the electric lamp. Thus when the contacts 50 and 51 are closed a circuit is established from the source of energy through the brush 58, ring 46, contact 50 and 51, gear 42, brush 56 to the electrical lamp and back to the source of energy. It is to be understood that the circuit closing mechanism and the specific structure of the parts through which the current is carried to the signalling device are merely typical of any equivalent arrangement of which I may avail myself in the carrying out of the invention.

In operation, the ice cream maker determines the quantity of brine required for bringing the batch down to the critical whipping temperature. He then turns the knob 44 until the switch has assumed an angular position which corresponds to the predetermined quantity of brine. This position may be indicated to the operator by a scale 60 engraved upon said knob. The brine valve 19 is then thrown to the open position shown in Figure 1, permitting the brine to pass through the jacket of the freezer and through the meter. At the moment the hand 38 indicates that the predetermined quantity of brine has passed through the freezer the lever 41 will engage the contact 50 closing the switch and causing the illumination of the lamp 57. This is a signal for the operator to shift the valve excluding the brine flow from the jacket. The hand 38 is then set back to the zero position in readiness for another freezing operation. The hand 37 is a totalizing indicator and is no wise affected by the operation of the electrical circuit closing mechanism.

While I have above described what I have found to be a very practical embodiment of means which may be utilized in the realization of my improved method of ice cream making, it is nevertheless to be understood that the invention may also be exemplified in numerous other alternative constructions and I accordingly reserve the right to adopt all such legitimate changes which may be fairly embodied within the scope of the invention as claimed.

Having described my invention what I claim as new and desire to secure by Letters Patent, is:—

The method of making ice cream which comprises passing a refrigerant in heat interchanging relationship with a batch of ice cream mixture and concurrently integrating the flow of the refrigerant, interrupting the flow of the refrigerant after a quantity thereof, predetermined according to the composition of the mixture and the temperature of the refrigerant and measured by such integration, has passed in heat interchanging relationship with the mixture, and then whipping the mixture.

In testimony whereof I affix my signature.

JOSEPH WILLMANN.